Patented Mar. 7, 1939

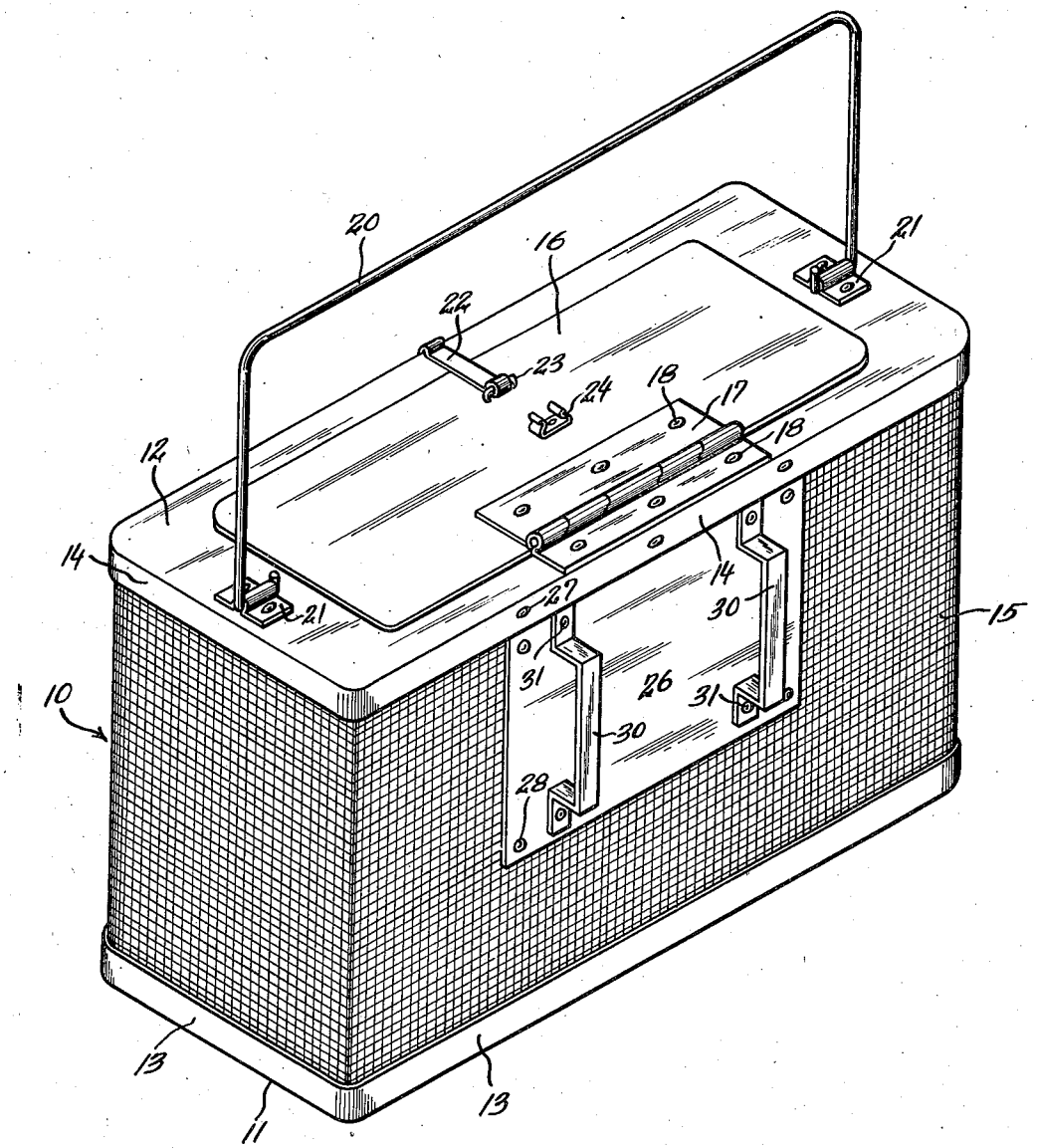

2,149,482

UNITED STATES PATENT OFFICE 2,149,482

FISHERMAN'S LIVE BAIT CAGE

Stanley E. Whitaker, Middletown, Ohio

Application October 15, 1937, Serial No. 169,209

1 Claim. (Cl. 43—55)

This invention relates to a live bait cage and more particularly to one having an all purpose character.

It is the principal object of this invention to provide for the reception of live bait such as crawfish, hellgramites, frogs, crickets, grasshoppers, bugs, earthworms, night crawlers, grubs, cut-bait minnows, etc., a strong and attractive cage or basket which affords good visibility and is well ventilated.

Other objects of this invention relate to the construction of the cage which provides a compact and light structure having walls of wire mesh or hardware cloth, a solid sheet metal bottom, and a similar top provided with a hinged closure including means whereby to secure the cage to a fisherman's belt, the whole being of simple construction, of great strength, easily handled and adaptable for practically all bait purposes.

Other objects and advantages will appear as the nature of the invention is better understood, reference being had to the accompanying drawing in which in the single figure there is illustrated a satisfactory embodiment of the invention reduced to practice.

The single figure is a perspective view looking from the rear of the invention.

Referring to the drawing, the live bait cage is generally denoted by the reference numeral 10 and comprises a rectangular sheet metal base 11 and a similar sheet metal top 12, each preferably formed of 28 gauge galvanized sheet iron. The base or bottom 11 of the cage is provided along each edge thereof with an upstanding flange 13, while the top 12 is provided with a similar depending flange 14, both flanges being preferably of equal depth.

The walls of the cage are formed of $\frac{1}{16}$ or $\frac{1}{8}$ inch hardware cloth or wire mesh 15, of any desired height bent to conform to the shape of the base 11 and top 12 with the upper and lower edge portions thereof seated within the flanges 13 and 14 and securely attached thereto in any desired manner as for example by soldering.

The top 12 is provided with a centrally disposed rectangular opening covered by a lid 16 hingedly attached to the top 12 as by the hinge 17 adjacent one side edge portion thereof to be hereinafter designated as at the back of the cage 10, the hinge 17 is secured to the lid and top by rivets 18. Any other suitable fastening means such as soldering, spotwelding, etc., may of course be utilized.

Arranged in the longitudinal center plane of the top 12 is a handle 20 preferably formed of heavy wire, the end portions of which are pivotally attached to the top by the brackets 21 in the manner well known, as shown. In the transverse center plane of the lid 16 is a latch 22, pivotally attached at one end as by the yoke 23 to said lid, the other end of the latch being adapted to engage a suitable catch (not shown) on the front flange 14 of the top 12, in a conventional manner. Rearwardly of the yoke 23 on the lid 16 is a spring clip or catch 24 fastened to said lid adapted to engage the latch 22 when the same is in its open position and to hold the same down when the lid is opened. With the latch 22 in the position shown in the drawing the lid is locked to the top 12. This form of latch construction allows opening and closing of the lid without any attention on the part of the fisherman thereto in the manipulating thereof.

Provided on the outside of the rear wall of the cage 10 is a sheet metal panel 26 the upper end of which is preferably fitted inside of the flange 14 and secured thereto as well as to the wire mesh by the rivets 27 and 28. Loops 30 are secured to the panel 26, one at each end thereof, by rivets 31 and are adapted to receive therethrough the fisherman's belt for attachment of the cage thereto, in the manner readily apparent.

The form of live bait cage as described above is adaptable for all bait purposes. For example, when young mice are used for bass fishing it is a regular mouse cage. It is handy while catching bait because it can be opened, the bait placed in the cage, and the lid closed and fastened down all with one hand. By placing a few wet leaves or grass on top of the bait the same may be kept alive for very long periods. Moss mixed with earth placed in the cage will enable one to keep night crawlers, red worms or earth-worms alive for weeks. By placing this cage within a bucket or container filled with water the same will form an excellent small minnow bucket. Crickets, grasshoppers and bugs are easy to take out by hand because of the flange around the top, and being prevented from crawling out when the lid is opened by said flange and top. It will thus be easily seen that the bait cage has a wide variety of purposes.

It is thought that the simplicity of the construction and the advantages thereof will be apparent from the foregoing without further detailed description.

Having thus set forth and disclosed the nature of this invention, what is claimed is:

A bait cage comprising a rectangular sheet metal base having an integral upstanding continuous flange formed along the edges thereof with the corners of said base rounded, a sheet metal top similar in shape to said base and having an integral depending continuous flange formed along the edges thereof with the corners of said top rounded, wire mesh walls joining said base and top with the lower and upper edge portions thereof respectively disposed inside of said base and top flanges and rigidly secured thereto, said top having an opening centrally thereof with the edges of the top defining said opening spaced from all the edges of said top, a sheet metal lid for said opening serving as a closure therefor and hingedly connected to said top adjacent the rear wall of said cage, a latch on said lid opposite said hinged connection for locking the same to said top, a spring catch on said lid for holding said latch in its unlocked position, a handle pivotally connected to said top in the longitudinal center plane thereof, a sheet metal panel rigidly secured to the rear wall of said cage and to the rear flange of said top and a pair of longitudinally spaced loop attaching members secured to said panel.

STANLEY E. WHITAKER.